United States Patent Office 2,705,206
Patented Mar. 29, 1955

2,705,206

COATED SILICA POWDER

George H. Wagner, Kenmore, N. Y., assignor, by mesne assignments, to Union Carbide and Carbon Corporation, a corporation of New York No Drawing. Application January 28, 1952, Serial No. 268,689

6 Claims. (Cl. 117—100)

This invention relates to a silica powder which has a chemically reactive surface, to a method of making such powder, and to chemical reactions employing such powder.

Finely-divided silica having an extensive surface area per unit weight may be manufactured by the combustion of silicon compounds, such as silicon tetrachloride, tetraethyl silicate, or a chlorosilane. The resulting product is useful as a filler or thickening agent but still exhibits the chemical inertness typical of silicon dioxide. In addition, such silica powders are readily wet by water which leads to instability of greases and the like containing the powders as thickening agents. When employed as fillers in rubber and other elastomers, the present silica powders do not modify the elastomer chemically.

According to this invention, a silica powder having an extensive surface area per unit weight is treated with a chlorosilane of the group consisting of trichlorosilane, $HSiCl_3$, and dichlorosilane, $H_2SiCl_2$. As a result of the treatment, the silica becomes coated with the hydrolysis product of the chlorosilane used. The water required for the hydrolysis may be present as absorbed moisture in the silica, as water vapor in the atmosphere, or water may be added when relatively large amounts of the chlorosilanes in relation to the silica powder are used. The coating of the hydrolysis product adheres firmly to the silica particles, and gives the silica a chemically reactive, water-repellent surface.

The chemical reactivity of this surface may be ascribed to the presence of silanic hydrogen in the coating, as the hydrolysis product of trichlorosilane is silicon oxyhydride $(HSiO_{3/2})_n$ and the hydrolysis product of dichlorosilane is silicon oxydihydride, $(H_2SiO)_n$. The coated silica powder is a strong reducing agent, and it will reduce silver salts to the metal. Active silver catalysts supported on silica may be prepared in this manner. The coated silica powder will react with caustic soda and other alkaline materials to release hydrogen. The coated silica powder will also react with olefinic double bonds. Thus, it may be used as a cross-linking agent and filler in the vulcanization of rubber and polymers and copolymers of butadiene and other diolefines.

The amount of chlorosilane hydrolysis product formed on the silica powder bears a close relation to the amount of chlorosilane employed until the thickness of the coating approximately corresponds to a monomolecular layer of the hydrolysis product. This relationship was shown by treating 100 grams of a silica powder obtained by a combustion process and having a surface area of 300 sq. meters/gram with various amounts of trichlorosilane together with about the theoretical amounts of water required in each case for complete hydrolysis of the trichlorosilane ($HSiCl_3$) to silicon oxyhydride $$(HSiO_{3/2})_n$$

allowing for the presence of one gram of water in the silica used. It is calculated that such silica powder containing about 16.6% silicon oxyhydride based on the total composition would contain a monomolecular layer of the silicon oxyhydride. The results are shown below:

Table I.—Silica coated with silicon oxyhydride

| $HSiCl_3$ Added, Grams | Amount of $(HSiO_{3/2})_n$ in in 100 gm. Silica (grams) | | Percent $(HSiO_{3/2})_3$ in Silica Product |
|---|---|---|---|
| | Theoretical | Found | |
| 21.5 | 8.4 | 8.0 | 7.4 |
| 45.5 | 17.8 | 16.8 | 14.4 |
| 65.5 | 25.6 | 20 | 16.6 |

While larger amounts of trichlorosilane can be used than required for the formation of an amount of silicon oxyhydride calculated to correspond to a monomolecular layer, there is little advantage in using such larger amounts because (1) a silica surface having a monomolecular layer of silicon oxyhydride has probably attained its maximum chemical reactivity and (2) such surfaces have optimum water repellency. On the other hand, water-repellent coated silica may be obtained by employing smaller amounts of trichlorosilane than required for the formation of a monomolecular layer of silicon oxyhydride on the silica. This is shown in the table below, wherein the degree of water repellency of silica (surface area—300 sq. meters/gm.) coated with various amounts of silicon oxyhydride was determined by adding about 0.05 gram of the coated silica to a one-ounce bottle one-half filled with distilled water. The bottles were shaken once a day and inspected periodically to determine the amount of material floating.

Table II.—Water repellency of silicon oxyhydride coated silica

| Percent $(HSiO_{3/2})_n$ in Silica Product | Percent of Coated Silica Floating After Time in Days | | |
|---|---|---|---|
| | 0 | 6 | 12 |
| 4.7 | 5 | 1 | 0 |
| 8.1 | 100 | 98 | 75 |
| 8.9 | 100 | 95 | 80 |
| 11.5 | 100 | 98 | 80 |
| 14.4 | 99 | 95 | 80 |
| 16.6 | 100 | 100 | 100 |

In general, therefore, the amount of silicon oxyhydride or silicon oxydihydride hydrolysis product deposited on the silica may vary from 4 to 30% by weight, and the preferred range is 8 to 20%. The amount of hydrolysis product calculated to give a monomolecular layer will, of course, increase with the fineness of the silica powder. By a silica powder of extensive surface area per unit weight, we mean a silica powder having a surface of the order of magnitude of 50 to 600 square meters per gram.

The increased water-repellency of the silicon oxyhydride coated silica is of considerable importance in the formulation of greases. Finely-divided silica is a useful thickening agent for mineral oils to form greases but the greases so made have inadequate resistance to water. To demonstrate the superiority of the coated silica for making water-resistant greases, two greases were prepared. One grease contained 10% of an uncoated silica formed by a combustion process and 90% of a naphthylenic base oil having a viscosity of 283 SUS at 100° F.; the other contained the same amounts of coated silica and oil, but the silica used had been treated with $HSiCl_3$ so that it was coated with 8% of silicon oxyhydride. To 20 grams of each of these greases water was added in increments of 1 ml., the grease being stirred for 120 seconds at 150 R. P. M. after each increment. The first grease containing the untreated silica broke down in structure after 7 ml. of water had been added; the second grease absorbed 20 ml. of water without change in structure.

Silica coated with silicon oxyhydride or silicon oxydihydride readily reacts at elevated temperatures, for instance from 150 to 500° C. with unsaturated aliphatic hydrocarbons, such as ethylene, propylene, butylene, pentene, octene, acetylene, cyclohexene or butadiene to form addition products wherein the unsaturated hydrocarbon is firmly bonded to the oxyhydride or oxydihydride coating. The water-repellency of the coated silica is increased by reaction with the unsaturated hydrocarbon, butadiene being particularly effective for this purpose.

The following examples will serve to illustrate the practice of the invention:

*Example 1.—Silica coated with silicon oxyhydride*

One hundred (100) grams of finely-divided silica made by a combustion process were placed in a wide mouth gallon jug and 8 cc. of water were added. (In addition to this added water, about 1 percent by weight is normally present on the silica itself). The jug was covered, tumbled, and allowed to stand for 48 hours. Thirty-four (34) cc. of $SiHCl_3$ were added in small portions with tumbling so that the evolution of hydrogen chloride gas was at a steady slow rate as the silicon oxyhydride coating was formed. The product was spread to a ¼ inch bed and allowed to stand over night, open to the air. Analysis showed 14.35 percent silicon oxyhydride. A monomolecular layer in the case of this silica (surface area=300 sq. meters/gram) would be about 16.6%. The product was quite water repellent.

*Example 2.—Silica coated with silicon oxydihydride*

One hundred (100) grams of finely-divided silicon made by a combustion process were placed in a gallon bottle to which 3 grams of water were added. After tumbling and aging overnight, the silica was placed in a 2-gallon vacuum desiccator which was evacuated. About 8 cc. of $SiH_2Cl_2$ was slowly vaporized into the system, where it reacted with the water coated silica over a two-hour period. Analysis for silanic hydrogen by measuring the volume of hydrogen evolved upon treatment with 25% aqueous KOH showed 6.4% by weight of silicon oxydihydride. The product was water repellent.

*Example 3.—Alkylation of silicon oxyhydride coated silica*

Silicon oxyhydride coated silica, made as described in Example 1, was placed in a one-inch I. D. "Pyrex" glass tube and a number of olefins were passed upwards through the silica bed at a temperature of 450° C. and at atmospheric pressure. Nitrogen gas was employed as a carrier for the olefins boiling higher than ethylene. The results are tabulated below, the amount of added olefin being calculated as $RSiO_{3/2}$ where R is the alkyl radical corresponding to the olefin. The analyses for unreacted silanic hydrogen were made by reaction with hot 25% KOH, and checked in several instances by combustion analysis for carbon and hydrogen.

| Initial Percent by Weight of Silicon Oxyhydride in Silica Used | Reactant Hydrocarbon | Reaction Time, Hrs. | Alkylation Product | | Percent Water Repellency [a] | |
|---|---|---|---|---|---|---|
| | | | Wt. Percent $HSiO_{3/2}$ | Wt. Percent $RSiO_{3/2}$ | 1 day | 15 days |
| 0 | Ethylene | 4 | 0 | 0 | 0 | --- |
| 8.1 | None | --- | 8.1 | 0 | 100 | [b] 65 |
| 8.0 | Ethylene | 0.5 | 5.6 | 3.5 | 100 | 95 |
| 9.0 | do | 0.5 | 5.9 | 4.5 | 100 | 95 |
| 8.0 | Octene-1 | 5 | 2.0 | 15.7 | 80 | 65 |
| 8.0 | Pentene-1 | 6 | 3.7 | 9.0 | 100 | 80 |
| 9.0 | do | 0.5 | 7.5 | 3.1 | 100 | 98 |
| 8.0 | Cyclohexene | 5 | 5.6 | 5.5 | 100 | 80 |
| 9.0 | do | 0.75 | 7.5 | 3.3 | 100 | 75 |
| 11.6 | Butadiene | 0.5 | --- | [c] 8.9 | 100 | 100 |
| 11.6 | Acetylene [d] | 1.5 | --- | 6.6 | 100 | 95 |

[a] See Table II.
[b] Extrapolated from Table II.
[c] By combustion analysis, as product was too water-repellent to be wet with 25% KOH solution.
[d] Alkylation at 350° C.

*Example 4.—Alkylation of silicon oxdihydride coated silica*

In a similar manner as described in Example 3, silica coated with silicon oxydihydride prepared as in Example 2 was reacted with ethylene and butadiene at various temperatures. The results are tabulated below:

| Initial percent by Weight of Silicon Oxydihydride in Silica Used | Reactant Olefins | Temp., °C. | Reaction Time, Hrs. | Alkylation Product | | Percent Water Repellency [c] | |
|---|---|---|---|---|---|---|---|
| | | | | Wt. percent $H_2SiO$ [a] | Wt. percent $(R)_2SiO$ [b] | 1 Day | 15 Days |
| 6.4 | None | --- | --- | 6.4 | 0 | 100 | 0 |
| 6.4 | Ethylene | 200 | 3 | 3.7 | 2.4 | 90 | 95 |
| 6.4 | do | 350 | 3 | --- | 5.9 | 95 | 99 |
| 6.4 | do | 450 | 0.5 | --- | 6.6 | 99 | 99 |
| 6.1 | Butadiene | 350 | 1.5 | --- | 4.3 | 100 | 100 |

[a] Analysis based on reaction with 25% caustic.
[b] Calculated from carbon combustion analysis.
[c] See Table II.

It will be noted that alkylation increases the water-repellency of silicon oxydihydride coated silica to a greater degree than does alkylation of silicon oxyhydride coated silica. In both instances, however, the alkylated products may be said to possess a high degree of water repellency.

This application is a division of my copending application Serial No. 58,809 filed November 6, 1948.

What is claimed is:

1. Process of making a water-repellent silica powder which comprises treating in the presence of water a silica powder of extensive surface area per unit weight with a chlorosilane of the group consisting of dichlorosilane and trichlorosilane, whereby the silica powder becomes coated with a hydrolysis product of the chlorosilane of the group respectively consisting of silicon oxydihydride and silicon oxyhydride, and subjecting the coated silica powder at a temperature between 150° and 500° C. to the vapors of an unsaturated aliphatic hydrocarbon to form an addition product between said hydrolysis product and said hydrocarbon.

2. Process as claimed in claim 1 in which the unsaturated hydrocarbon is ethylene.

3. Process as claimed in claim 1 in which the unsaturated hydrocarbon is butadiene.

4. Process as claimed in claim 1 in which the unsaturated hydrocarbon is pentene-1.

5. Process as claimed in claim 1 in which the unsaturated hydrocarbon is acetylene.

6. Process as claimed in claim 1 in which the unsaturated hydrocarbon is cyclohexene.

(References on following page)

References Cited in the file of this patent

UNITED STATES PATENTS

| | | |
|---|---|---|
| 2,381,479 | Adams | Aug. 7, 1945 |
| 2,561,177 | Barry | July 17, 1951 |
| 2,578,605 | Sears et al. | Dec. 11, 1951 |
| 2,589,705 | Kistler | Mar. 18, 1952 |
| 2,595,465 | Keene et al. | May 6, 1952 |

FOREIGN PATENTS

| | | |
|---|---|---|
| 260,031 | Great Britain | Oct. 18, 1926 |